June 27, 1961  G. H. CASSADY ET AL  2,990,002
METHOD AND APPARATUS FOR FABRICATING AIR SPRING DIAPHRAGMS
Filed Jan. 12, 1959  5 Sheets-Sheet 3

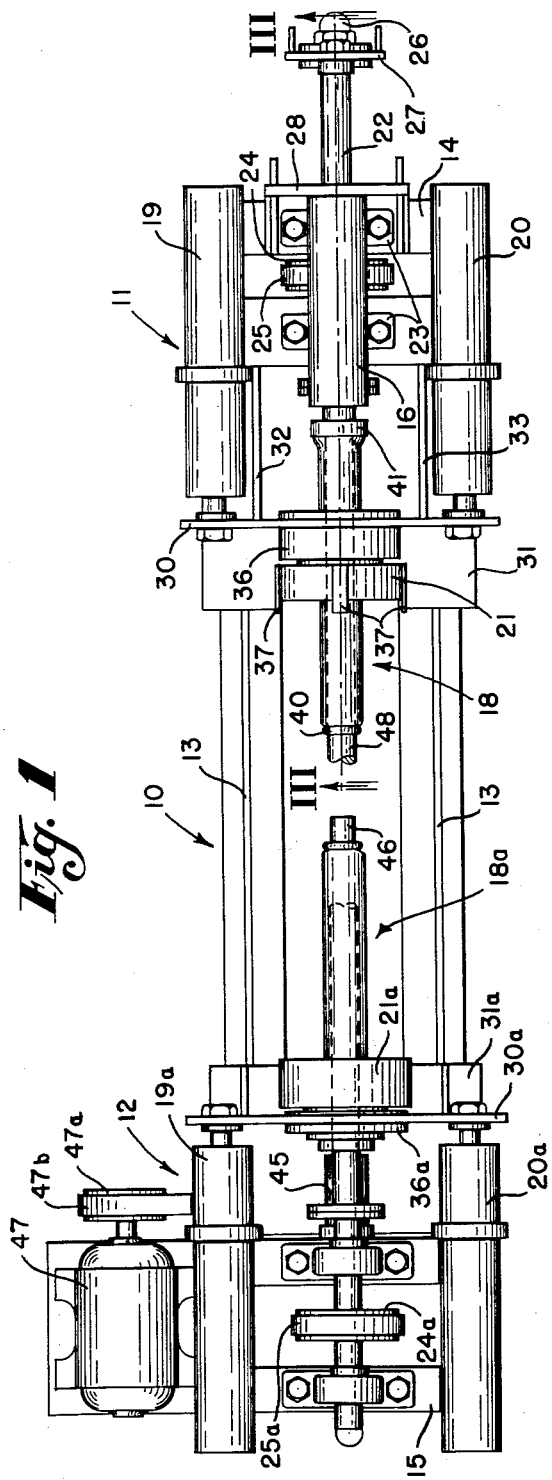
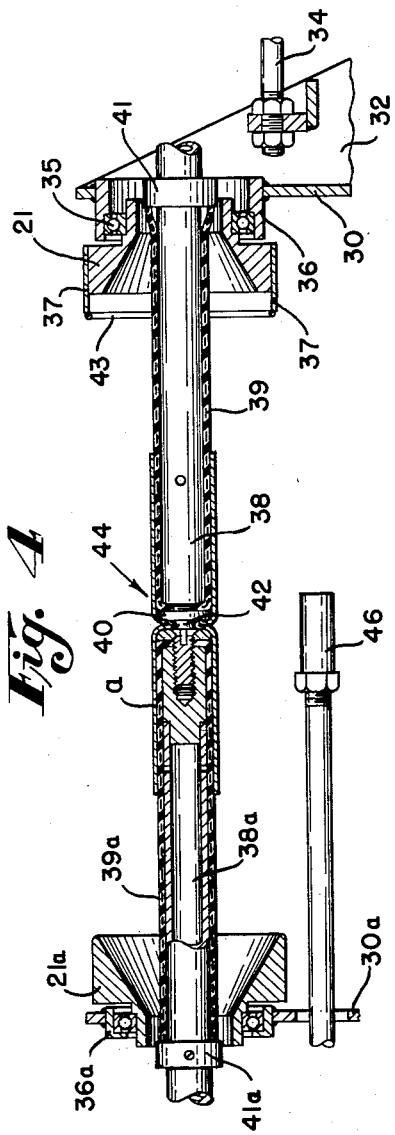
INVENTORS
GERALD H. CASSADY
DORR J. HINMAN
BY
Irwin M. Lewis
ATTORNEY.

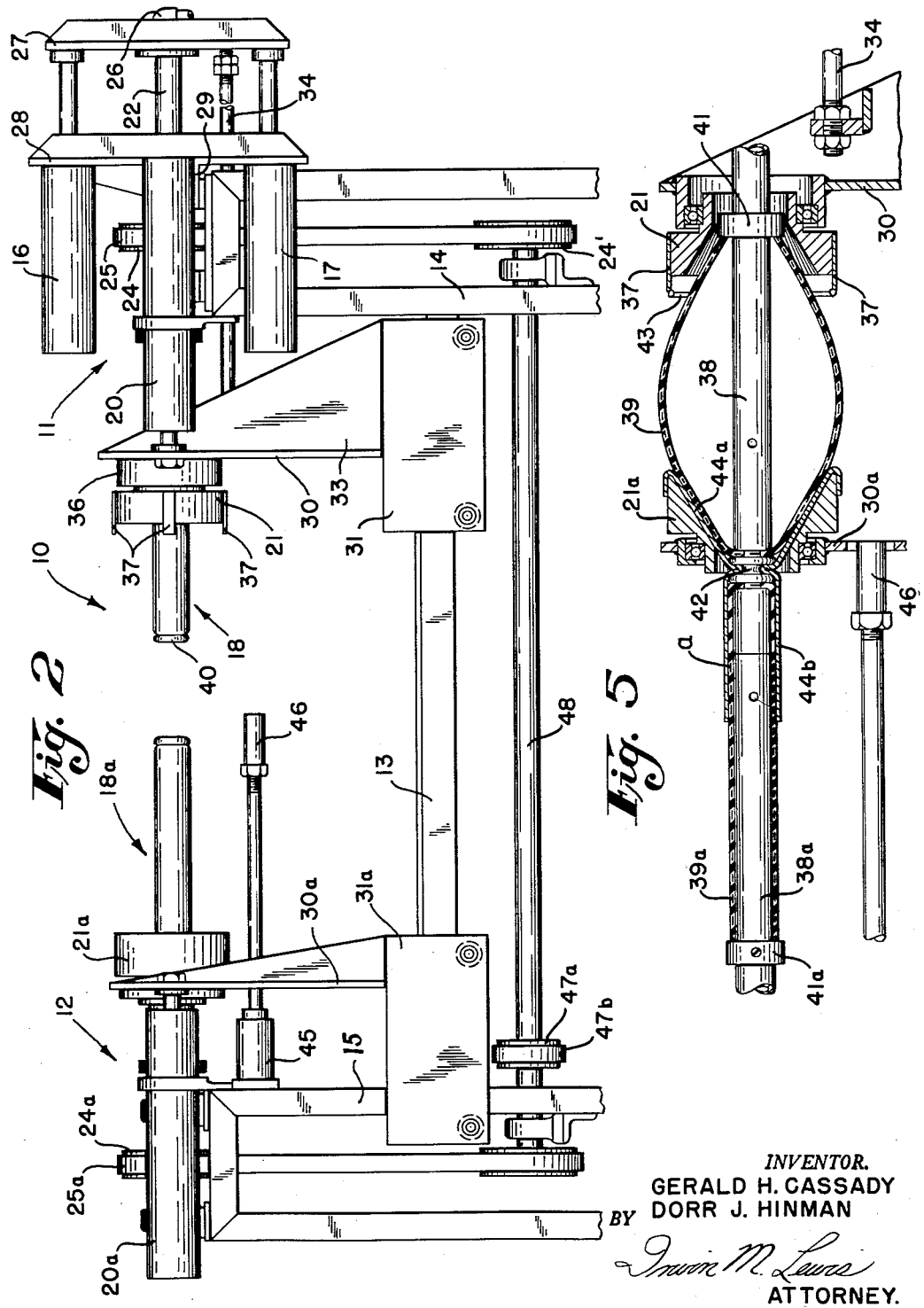

INVENTOR.
GERALD H. CASSADY
DORR J. HINMAN
BY Irwin M. Lewis
ATTORNEY.

June 27, 1961   G. H. CASSADY ET AL   2,990,002
METHOD AND APPARATUS FOR FABRICATING AIR SPRING DIAPHRAGMS
Filed Jan. 12, 1959   5 Sheets-Sheet 4

INVENTOR.
GERALD H. CASSADY
BY DORR J. HINMAN

Irwin M. Lewis
ATTORNEY.

June 27, 1961 G. H. CASSADY ET AL 2,990,002
METHOD AND APPARATUS FOR FABRICATING AIR SPRING DIAPHRAGMS
Filed Jan. 12, 1959 5 Sheets-Sheet 5

INVENTORS
GERALD H. CASSADY
BY DORR J. HINMAN

*Irwin M. Lewis*
ATTORNEY.

United States Patent Office 2,990,002
Patented June 27, 1961

2,990,002
METHOD AND APPARATUS FOR FABRICATING AIR SPRING DIAPHRAGMS
Gerald H. Cassady and Dorr J. Hinman, Detroit, Mich., assignors to United States Rubber Company, New York, N.Y., a corporation of New Jersey
Filed Jan. 12, 1959, Ser. No. 786,135
21 Claims. (Cl. 154—1)

This invention relates to the art of fabricating diaphragms, and more specifically to an improved method and apparatus for fabricating diaphragms for use in fluid springs and the like.

The diaphragms produced by this invention are useful in various environments and are especially useful as an element of a fluid spring of the controlled area type which comprises a cylinder, a piston, and a flexible diaphragm which connects the piston to the cylinder. This type of diaphragm generally comprises a flexible, flared and generally cup-shaped tubular member having one end of substantially greater circumference than the other end, the larger end being connected to the cylinder and the smaller end to the piston. As used in an air spring, the diaphragm is turned inside out in the course of a full stroke of the piston and, as a consequence, may be pinched between the piston and the cylinder and thereby damaged unless adequate restraint is provided to prevent excessive relative lateral movement between the piston and the cylinder.

As disclosed in the co-pending application of D. R. Elliott, et al., Serial No. 495,534, filed March 21, 1955 and entitled "Fluid Spring," which is hereby incorporated by reference, such restraint is provided by employing superposed coextensive plies of cord fabric extending from one end of the diaphragm to the other, with the individual cords of one of the plies extending across the individual cords of the other ply at an included angle of between 30° and 150°. This angle is preferably between 70° and 100°. Expressed in terms commonly used in diaphragm, tire, and related arts, the cords of the individual plies are alternatively laid in different directions at a "cord angle" of between 15° and 75°, but preferably between 40° and 55°; the term "cord angle" being defined as the angle between the individual cords and a plane perpendicular to the surface of the plies and through a line tangential to and in the plane of a circumferential line of said surface. The cords of the tubular member are substantially inextensible. Each end of the tubular member is provided with an annular bead portion which is secured to a corresponding bead wire. The end of greater circumference may also be provided with a continuous outwardly projecting lip of a resilient compressible composition, such as rubber.

Specifically, this invention comprises an improvement over that disclosed in the co-pending application of G. O. Edgerly, et al., Serial No. 643,470, filed March 1, 1957 and entitled "Diaphragm for Fluid Springs and Method of Making the Same," which is hereby incorporated by reference. As disclosed therein, the diaphragm can be formed from either a single tubular member made from a single piece of cord fabric that is coated with a flexible fluid-impermeable composition, such as rubber, and folded intermediate its end to obtain two relatively superposed, substantially coextensive and coaxial tubular plies, or from two separate coated tubular units which are superposed on one another. If the end portions of the single tubular unit, or the two separate tubular units, are superposed and attached to one another and then shaped or flared simultaneously, a change or reduction in cord angle or included angle occurs, due to the pantograph action between the cords of the superposed plies. This reduction in cord angle appears primarily at the large bead end of the diaphragm where the plies are flared to the greater extent. The flaring at the large bead end of the diaphragm relocates the cord angle so that the cords are substantially circumferential, having a cord angle of zero, and thus in such a case it may be impossible to flare the fabric material to the extent desired. Furthermore, it is necessary to have maximum strength in the cords of the large bead end whereas high strength is not as necessary near the small bead end. As a low cord angle leads to low net strength, it was desired to maintain the cord angle near the large flared or bead end of the diaphragm. It was discovered that if each ply were shaped or flared separately before superposing one ply upon the other that the cord angle of each ply could be maintained or retained as desired. Although such a procedure generally maintains the cord angle at the large bead end within the range specified, it results in a lower cord angle at the large bead end, where the expansion is the greatest, then in the central portion of the tubular diaphragm. In some instances the cord angle in the large bead end may even be lower than the specified preferred range.

Thus, the primary object of this invention is to provide a method and apparatus for the fabrication of diaphragms in such a manner as to maintain the predetermined angular relationship of the plies of cord fabric without distortion, wherein the cord angles or included angles of the central portion and the large bead portion are substantially the same.

The apparatus not only performs the above novel function but also represents an efficient, semi-automatic device for the fabrication of diaphragms in general and in particular for carrying out the fabricating method of the aforementioned copending application, Serial No. 643,470 filed March 1, 1957, by avoiding the necessity of maintaining constant air pressure and inflatable bag strength, which is virtually impossible unless the inflatable bags are replaced wtihin short intervals, in order to reproduce diaphragms of uniform size.

Thus it is a further object of this invention to provide an improved apparatus for fabricating diaphragms of uniform and reproducible size regardless of irregularities in air pressure.

A further object of this invention is to provide an improved apparatus for fabricating diaphragms wherein the decrease in inflatable bag strength, due to continued use, will not adversely affect the desired size uniformity in the fabricated diaphragms nor necessitate the costly practice of replacing said bags after continued use has affected the expansion characteristics of the bag.

Briefly, the above objects are obtained by completely expanding one end portion of the fabric tubular unit, drawing said one end portion completely over the other end portion of the tubular unit to a relaxed position short of the final position of the one end portion, partially expanding the other end portion into adhering contact with the one end portion without contracting the relaxed free portions adjacent the edges thereof, drawing the one end portion to said final position to stretch the free portion adjacent the edge of said one end portion thereby correcting distortion in said free portion and completely expanding the other end portion to simultaneously stretch the free portion adjacent the edge of said other end portion thereby correcting distortion in said free portion and expand said free portion into inhering contact with the free portion adjacent the edge of said one end portion. The device for accomplishing the above fabricating procedure comprises first and second opposed inflatable mandrels, means for moving one of the inflatable mandrels relative to the other, first and second annular shaping forms mounted concentric with the inflatable mandrels, and means for individually moving the shaping forms relative to the inflatable mandrels and to each other.

The enumerated objects and other objects, together with advantages of this invention, will become readily apparent from the following detailed description taken in conjunction with the annexed drawings, wherein:

FIG. 1 is a plane view of the apparatus in an inoperative position;

FIG. 2 is a front elevation view of FIG. 1;

FIG. 4 is a sectional view showing the first action of the machine and the operation performed relating to the action;

FIG. 5 is another sectional view showing the second action and operation;

Figure 3:
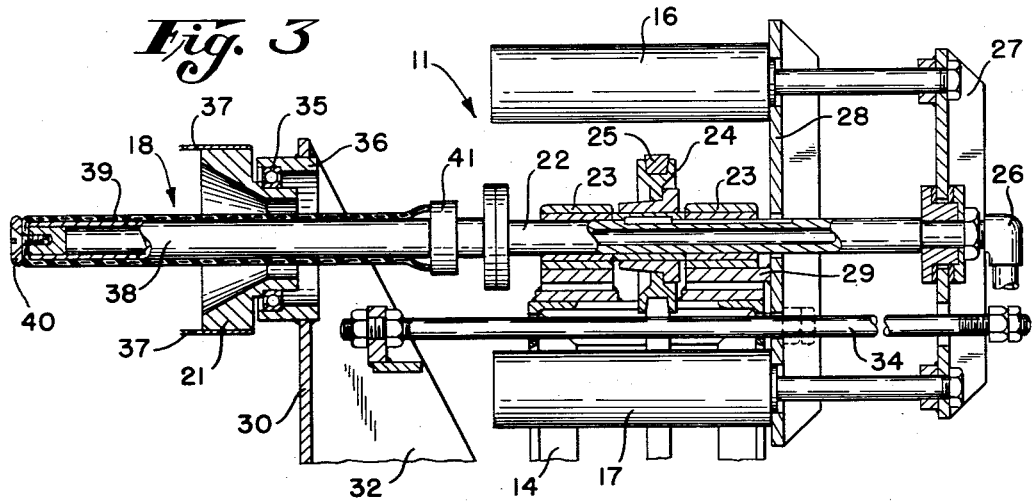
FIG. 3 is an enlarged sectional view taken on line 3—3 of FIG. 1.

Referring to FIGS. 1, 2 and 3 of the drawings, wherein like reference numerals denote corresponding parts in all figures, the apparatus 10 may be best described by dividing it into a right and left assembly 11 and 12 respectively.

The apparatus has a pair of spaced apart rails 13 connected at either end to a right frame 14 and a left frame 15 on which the components of the apparatus move in the fabrication of the diaphragm.

The right assembly 11 has a pair of vertically aligned air-piston cylinders 16 and 17 for horizontally reciprocating a right inflatable mandrel 18, and another pair of horizontally aligned air-piston cylinders 19 and 20 for horizontally reciprocating a right shaping form 21. A tubular hollow shaft 22 of the inflatable mandrel 18 is mounted on a pair of spaced apart bearings 23 on right frame 14 for both reciprocating horizontal and rotational movement. Between the pair of bearings 23, is a first pulley 24 concentrically mounted on shaft 22 in vertical alignment with a second pulley 24' and a belt 25 interconnecting the pulleys for rotating hollow shaft 22 of the inflatable mandrel 18. The end of hollow shaft 22 has a swivel connection 26 for admitting air to the interior of the hollow shaft. The end of shaft 22 is also rotatably connected to a vertical bar 27 attached to the rods of the air-piston cylinders 16 and 17. The cylinders 16 and 17 are mounted on the right frame 14 by means of a vertical plate 28 welded to a cross plate 29 which is bolted to the frame under the bearings 23.

The right shaping form 21 is concentrically mounted over the right mandrel 18 by means of a vertical plate 30 which is attached to the rods of air-piston cylinders 19 and 20. Plate 30 is supported on a base 31 which is slidably mounted on rails 13. Gusset plates 32 and 33 are attached to plate 30 and base 31, and support an adjustable stop 34 for controlling the extent of horizontal movement of shaping form 21. The shaping form 21 is mounted in a bearing 35 in a housing 36 welded to the plate 30. Thus the shaping form 21 is mounted for both reciprocating horizontal movement along rails 13 and rotational movement within housing 36. Spaced projections 37 extend beyond shaping form 21 for holding a large substantially inextensible and/or incompressible bead wire. The projections 37 may be grooved at their transverse faces, as shown at 37' in FIG. 11, to hold the bead wire in place. Rather than providing grooves for the reception of the bead wire, the projections 37 may be sprung outwardly so as to hold the bead wire in place within said projections. The projections 37 also cooperate with the movement of the shaping forms for holding the ply over the bead ring, as described hereinafter.

The hollow tubular section 38 of shaft 22, which supports the inflatable member 39 of mandrel 18, projects through the right shaping form 21 and is plugged at the end for attachment to the end of the inflatable member 39 by means of a cap and screw 40, as illustrated in FIG. 3. The other end of the inflatable member 39 is slidably mounted on the tubular section 38 of shaft 22 by means of an air sealed collar 41. The hollow tubular section 38 is perforated, as illustrated in FIGS. 3 and 4, to allow inflation of member 39. The inflatable member or bag 39 is reinforced with fabric throughout its entire length, as shown in FIGURE 4, so that expansion may be properly controlled.

Referring now to the left assembly 12, the construction is very similar to that of the right assembly 11 as described above except that the left mandrel 18a is not adapted for riciprocating horizontal movement, the end plug which secures the end of the inflatable member or bag 39a to the tubular shaft 38a is designed to support a spool or disc 42 for the small end closure of the diaphragm, the inflatable bag 39a is rigidly secured to the hollow tubular shaft 38a by collar 41a to eliminate sliding movement of the inflatable bag on shaft 38a, a retractable stop is provided for limiting the horizontal movement of the right shaping form 21, and a motor is provided for rotating both mandrels during fabrication of the diaphragm. Also, as illustrated in FIG. 4, the fabric reinforcements in the left inflatable bag 39a do not extend throughout the entire length of the bag but terminate at a point "a" short of the end of the bag underlying the ply to be shaped. The left shaping form 21a is identical in construction to the right shaping form 21 except that the projections 37 are omitted from the left shaping form.

The operation of the above-described apparatus is illustrated in FIGS. 4–11. Referring to FIG. 4 which illustrates the first step in the fabrication of the diaphragm, a spool or disc 42 is placed in the end plug of left mandrel 18a and a large bead wire ring 43 is placed on the spaced projections 37 of the right shaping form 21. The expression "bead wire" as used in this description and in the appended claims has reference to the various types of annular wire units and includes bead wire bundles comprising a plurality of turns of wire and bead wire elements comprising a single turn of a solid wire. The right mandrel 18 is then moved towards the left mandrel 18a, by the action of air-piston cylinders 16 and 17, until the spool 42 is engaged between the right and left mandrels. A one-ply fabric, cylindrical tubular unit 44 is then formed on the mandrels. Tubular unit 44 is made from a strip of substantially inextensible weftless or weakened weft cord fabric of the type used in the manufacture of pneumatic tire casings. The strip may also be formed of a braided or knitted fabric and, accordingly, the term "cord fabric" as used herein and in the claims is intended to embrace braided and knitted fabrics as well as conventional cord fabrics. The cords of the fabric may be of nylon, cotton, rayon, steel, glass, or other relatively inextensible flexible material. The cord fabric is coated, covered, or otherwise provided with a flexible resilient rubber, either natural or synthetic, or other suitable flexible resilient plastic material which will render the fabric fluid-impermeable. The strip of cord fabric is bias-cut and wrapped around the right and left mandrels in a generally helical path, with adjacent edges abutting, care being taken that the previously defined "cord angle" lies within the range specified. Alternatively, the fabric tubular unit 44 may be formed on a forming mandrel (not shown), slipped over one of the mandrels before they are engaged with disc 42 and then properly positioned after the mandrels have been engaged. The fabric unit 44 is then tied to the disc 42 with a fine wire or cord, thereby contracting the portion of the fabric unit overlying the disc.

The second step, illustrated in FIG. 5, involves the preliminary shaping of the right half of the fabric unit 44 which will constitute the outer ply of the finished diaphragm. To accomplish this, the left shaping form 21a is moved into position by the action of air-piston cylinders 19a and 20a, the right bag 39 is inflated with high pressure air, and the edge of the outer ply 44a is then turned back over the left shaping form 21a. When the right bag 39 is inflated, collar 41 slides or moves to the left because of the restriction of the reinforcing fabric which extends throughout the entire length of the bag, thereby permitting the expansion of ply 44a to take place in the region of the shaping form 21a.

Figure 6:
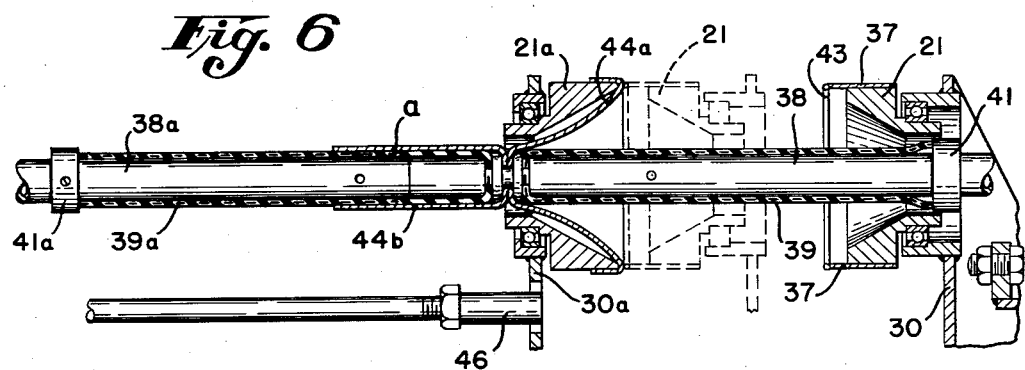
FIG. 6 is a sectional view showing the third operation when the right bag is deflated before the right form is moved to the dotted line position.
Figure 7:
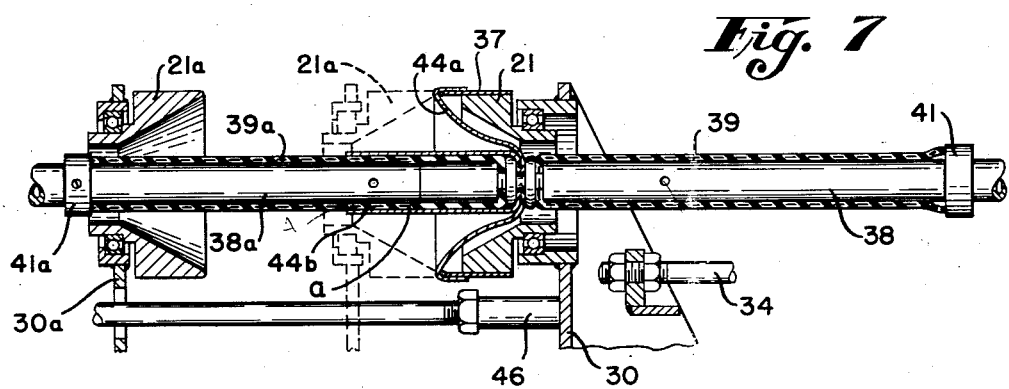
FIG. 7 is a sectional view showing a continuance of the movement illustrated in FIG. 6, during which the edge of the first ply is turned over the bead wire while the two forms are moving together toward the left side.

The third step is illustrated in FIGS. 6 and 7. The right bag 39 is deflated and the right shaping form 21, carrying bead wire 43, is moved to the left by the action of cylinders 19 and 20 to contact ply 44a and engage left shaping form 21a, as shown by the dotted line position in FIG. 6, from where the right and left shaping forms move together to the left side of the apparatus until left shaping form 21a reaches the dotted line position shown in FIG. 7. The preshaped outer ply 44a is relaxed and drawn completely over the ply 44b or unshaped portion of fabric unit 44 in the above-described movement of the shaping forms. During this movement, the operator reverses or turns the edge of ply 44a over bead wire 43. As both shaping forms are rotatable, the cord angle may be set to the specific angle desired by suitable rotation of the shaping forms during this movement. Also any folds in the fabric adjacent disc 42 may be eliminated at this time by rotation of the shaping forms. Just prior to the above action of the air-piston cylinder 19, 20 and 19a, 20a, a small air-piston cylinder 45 is actuated to project a stop 46 which limits the travel of right shaping form 21 to the position shown in FIG. 7. This position is just short of the final position of right shaping form 21 as controlled by stop 34 and thus, although ply 44a has been turned completely over unshaped ply 44b, it is in a relaxed condition similar to that in the FIG. 6 position. After stop 46 holts the movement of right shaping form 21, air-piston cylinders 19a and 20a are reversed so as to retract the left shaping form 21a to the solid line position shown in FIG. 7.

Figure 8:
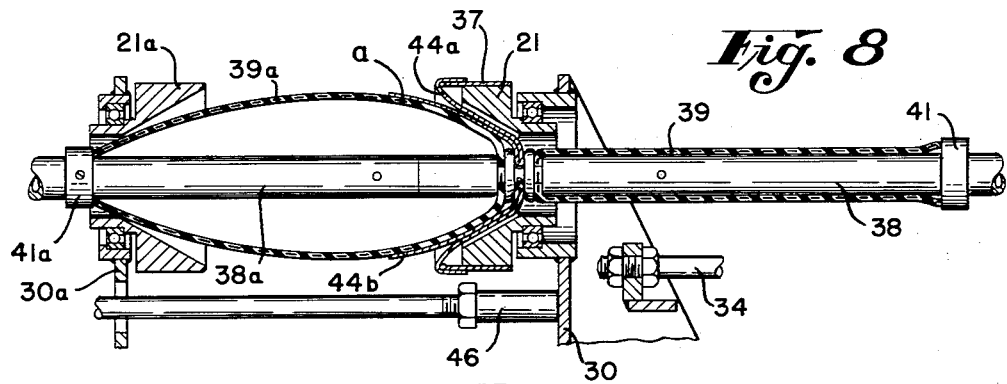
FIG. 8 is a sectional view showing the low pressure, partial forming of the second ply while the travel of the right form has been limited by a stop.
Figure 8A:
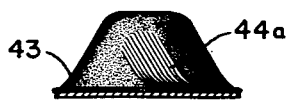
FIG. 8a shows the cord disposition of the first ply while at the FIG. 8 position.

The fourth step involves a low pressure partial shaping of the second or inner ply 44b. As shown in FIG. 8, inflatable bag 39a is inflated under low pressure to expand inner ply 44b into partial contact with outer ply 44a, the outer and inner plies adhering together only within the area of partial contact, which is adjacent the spool or disc 42. The portion of the outer ply 44a adjacent the bead wire 43, which is free from inner ply 44b, is still in a relaxed condition but the cord angle in this region has been distorted by the shaping step illustrated in FIG. 5, as shown in FIG. 8a. The same is true of the corresponding free portion of inner ply 44b.

Figure 9:
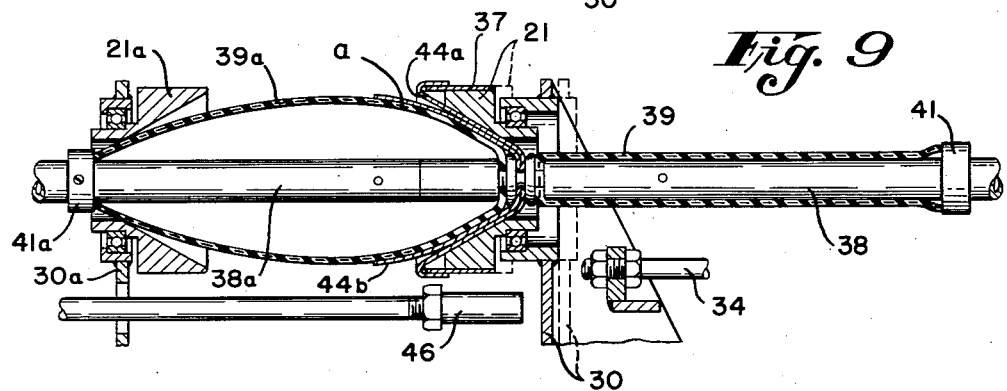
FIG. 9 is a sectional view showing the stop retracted and the right form moved to its limits while the shaping bag is still on low pressure.
Figure 9A:
FIG. 9a shows the cord disposition of the first ply when the movement shown in FIG. 9 is completed.

The fifth step, as shown in FIG. 9, involves the correction of the distorted cord angle in the free portion of outer ply 44a adjacent the large bead end. In this step, stop 46 is retracted by air-piston cylinder 45, allowing air-piston cylinders 19 and 20 to complete the remainder of their stroke until the end nuts on stop 34 engage plate 28, as shown by the dotted line position in FIG. 3. This additional movement of the right shaping form 21, while bag 39a is inflated under low pressure, stretches the relaxed or free portion of outer ply 44a thereby producing a reverse twist to the end of ply of 44a, as shown in FIG. 9a by the change from the dotted line to the solid line position. The fact that the shaping form 21 is mounted for free rotation greatly enhances the ease of accomplishing the reverse twisting effect to correct the distorted cord angle.

Figure 10:
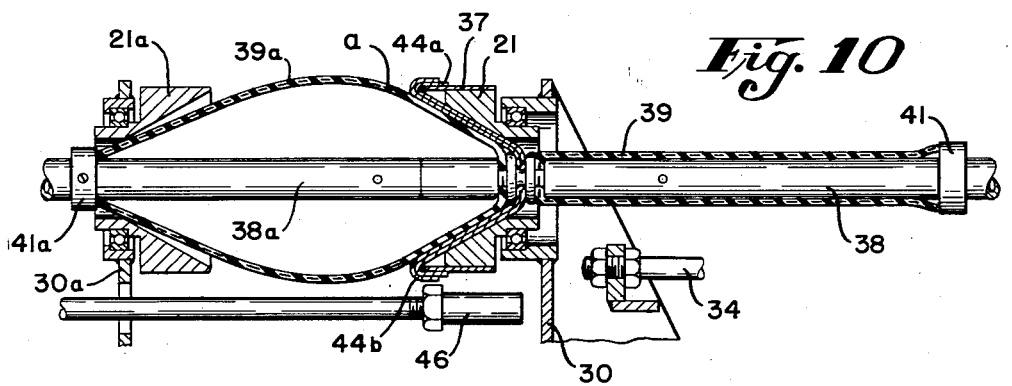
FIG. 10 is a sectional view showing the left bag inflated under high pressure to complete the formation of the plies.

In the next step, which is illustrated in FIG. 10, bag 39a is inflated under high pressure to expand the free portion of inner ply 44b adjacent the large bead end into contact with outer play 44a and adhere the plies together. It is well to note at this time that the collar 41a of inflatable bag 39a is secured to tubular shaft 38a to prevent horizontal movement of the bag relative to the shaft, and that the fabric reinforcements in the inflatable bag 39a terminate at a point short of the end of the bag, leaving the portion of the bag adjacent the spool or disc end devoid of reinforcements. These two features create a longitudinal movement of the bag towards the large bead end due to the greater radial and longitudinal expansion of the spool end of the bag under high pressure. This longitudinal movement of the bag stretches the free portion of the inner ply 44b adjacent the large bead end and, like the action shown in FIG. 9, produces a reverse twist to said portion of ply 44b thereby correcting the cord angle which has been distorted by the partial expansion step shown in FIG. 8. The edge of ply 44b is then turned over the edge of ply 44a, the "turn-up" or "turn-over" on the bead wire 43 being accomplished in the spaces between the projections 37.

Figure 11:
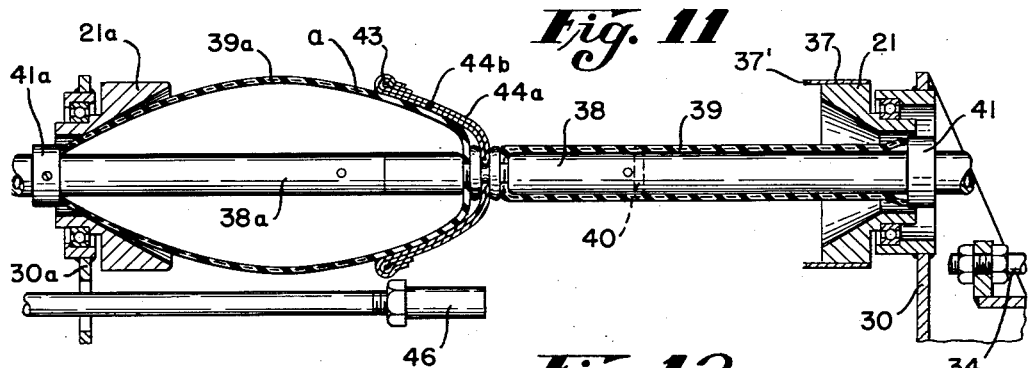
FIG. 11 is a sectional view showing the right form removed and the edges of both plies adhered over the bead wires to the tubular body of the diaphragm while the bag is inflated under low pressure.

In the last step, as shown in FIG. 11, the pressure in the left inflatable bag 39a is reduced to low and the right shaping form 21 is retracted by air-piston cylinders 19 and 20. The "turn-up" and body of the diaphragm are then adhered together on the inflatable bag by rotating both mandrels and holding a small hand roller against the "turn-up" and superposed plies. Obviously, the "turn-up" and superposed plies may be adhered to each other in the area between the projections 37 before retracting the right shaping form 21. The mandrels are rotated by a motor 47 which is connected by a pair of pulleys 47a and a belt 47b to jack shaft 48 which rotates both mandrels through belts 25 and 25a, as seen in FIGS. 1 and 2. The left bag 39a is then deflated and the right mandrel having the cap and screw 40 attached to the end thereof is retracted to the dotted line position shown in FIG. 11 to remove the diaphragm.

The two ply diaphragm may next be equipped at the large bead end with an extruded strip of uncured rubber or similar composition to form an outwardly projecting resilient lip at the large bead end. The fabricated diaphragm is then placed in an apparatus, such as that disclosed in the aforementioned copending application Serial No. 643,470, filed March 1, 1957, wherein it is molded and cured.

Figure 12:
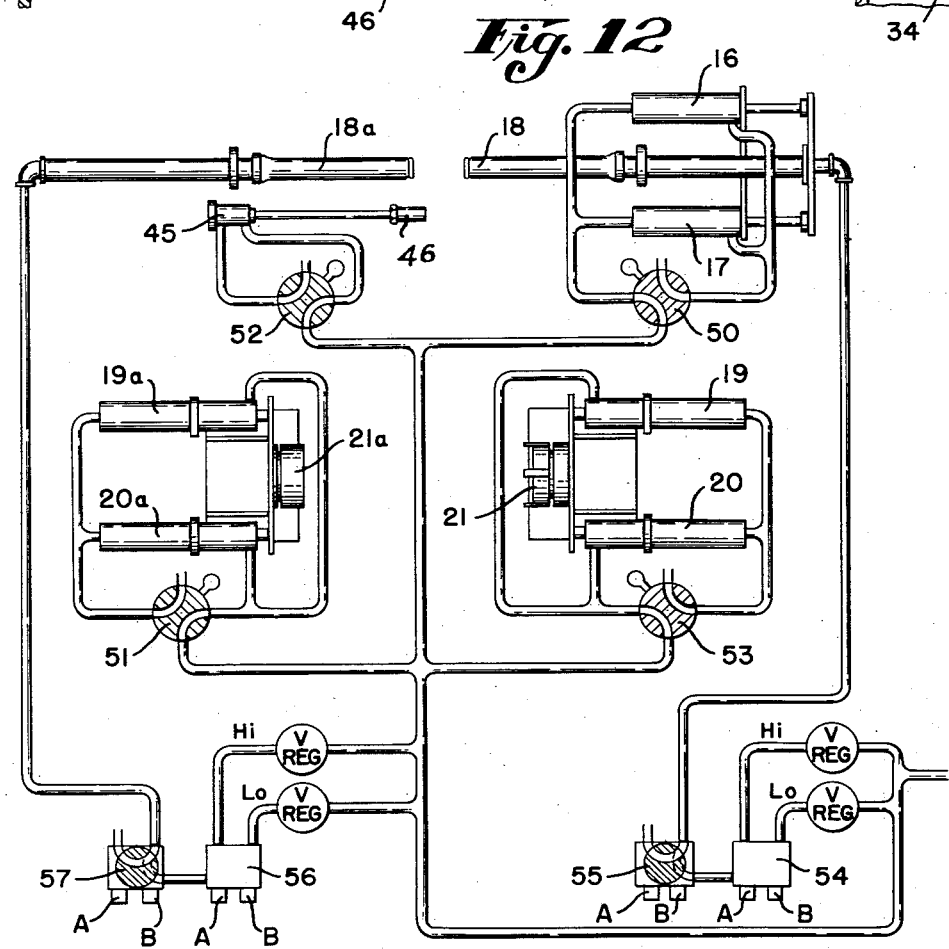
FIG. 12 is a diagrammatic illustration of the air system for controlling the operation of the apparatus.

FIG. 12 diagrammatically illustrates a preferred valve system for operating the described apparatus. The air-piston cylinders for initiating the actions necessary in the progressive steps of fabricating the diaphragm are controlled by manually operated air valves. Hand valves 50, 51, 52 and 53 actuate the air-piston cylinders and double pedal foot valves 54, 55, 56 and 57 control the inflation of the mandrels. Regulator valves are installed in the high and low pressure lines leading to foot valves 54 and 56. All valves and cylinders are shown in the starting position with valves 55B and 57B actuated to exhaust, valve 54A actuated for high pressure air, and valve 56B actuated for low pressure air.

The following valve sequence is used for operating the apparatus:

(1) Valve 50 actuated, right mandrel 18 in.
(2) Valve 51 actuated, left shaping form 21a in.
(3) Valve 55A actuated, high pressure air to right inflatable mandrel 18.
(4) Valve 54B actuated, low pressure air to right inflatable mandrel 18.
(5) Valve 55B actuated, pressure off—right inflatable mandrel 18 deflated.
(6) Valve 52 actuated, stop 46 in.
(7) Valve 53 actuated, right shaping form 21 in. To engage left shaping form 21a and move left to stop 46.
(8) Valve 51 released, left shaping form 21a moves to left separating from right shaping form 21.
(9) Valve 57A actuated, low pressure air to left inflatable mandrel 18a.
(10) Valve 52 released, stop 46 retracted, right shaping form 21 completes movement to left.
(11) Valve 56A actuated, high pressure air to left inflatable mandrel 18a.
(12) Valve 56B actuated, low pressure air to left inflatable mandrel 18a.
(13) Valve 53 released, right shaping form 21 returns to original position, "turn-up" and superposed plies adhered.
(14) Valve 57B actuated, left inflatable mandrel 18a deflated.
(15) Valve 50 released, right mandrel 18a returns to original position—diaphragm removed.
(16) Valve 54A actuated, normal starting position.

While a certain preferred form of the invention has been shown and described, it is understood that this is for the purpose of illustration and that modifications and variations thereon could be made without departing from the spirit and scope of the invention.

For example, the manner of contracting the central portion of the fabric tube 44 to form the small end of the diaphragm, previously referred to as the spool or disc end, may be varied in accordance with the teachings disclosed in the co-pending application of C. Mosshart et al., Serial No. 752,788, filed August 4, 1958 and entitled "Diaphragm for Fluid Spring and Methods of Making Same," which is hereby incorporated by reference. Thus the central portion of the fabric tube may be contracted by rotating one mandrel relative to the other mandrel thereby twisting the central portion of the tube to contract the same. The central portion may be contracted solely by the above twisting step or by the use of a spool or disc and/or tying wire or cord in conjunction with said twisting step. A conventional clutch arrangement on jack shaft 48 would enable the mandrels to be rotated relative to each other.

Having thus described our invention, what we claim and desire to protect by Letters Patent is:

1. A method of fabricating a diaphragm for use in a fluid spring comprising the steps of expanding one end portion of a flexible tubular unit formed from a strip of cord fabric coated with a flexible fluid-impermeable composition, drawing said one end portion completely over the other end portion of said tubular unit to a relaxed position short of the final position of said one end portion, partially expanding said other end portion into adhering contact with said one end portion without contacting the relaxed free portions adjacent the edges thereof, drawing said one end portion to said final position to stretch the free portion adjacent the edge of said one end portion, and simultaneously stretching the free portion adjacent the edge of said other end portion and completely expanding said other end portion to expand said free portion into adhering contact with the free portion adjacent the edge of said one end portion.

2. A method of fabricating a diaphragm for use in a fluid spring comprising the steps of forming a flexible tubular unit from a strip of cord fabric coated with a flexible fluid-impermeable composition, expanding one end portion of the tubular unit to thereby flare the same outwardly, drawing said one end portion completely over the other end portion of said tubular unit to a relaxed position short of the final position of said one end portion, partially expanding said other end portion into adhering contact with said one end portion without contacting the relaxed free portions adjacent the edges thereof, drawing said one end portion to said final position to stretch the free portion adjacent the edge of said one end portion thereby correcting distortion in said free portion caused by expansion, and completely expanding said other end portion to simultaneously stretch the free portion adjacent the edge of said other end portion, thereby correcting distortion in said free portion caused by expansion, and expand said free portion into adhering contact with the free portion adjacent the edge of said one end portion.

3. A method of fabricating a diaphragm for use in a fluid spring comprising the steps of securing the center of a flexible tubular unit formed from a strip of cord fabric with a flexible fluid-impermeable composition coating, expanding one half of said tubular unit, drawing said one half completely over the other half of said tubular unit to a relaxed position short of the final position of said one half, partially expanding said other half into adhering contact with said one half without contacting the relaxed free portions adjacent the edges thereof, drawing said one half to said final position to stretch the free portion adjacent the edge of said one half, and simultaneously stretching the free portion adjacent the edge of said other half and completely expanding said other half to expand said free portion into adhering contact with the free portion adjacent the edge of said one half.

4. A method of fabricating a diaphragm for use in a fluid spring comprising the steps of forming a flexible tubular unit from a strip of cord fabric coated with a flexible fluid-impermeable composition, contracting a central portion of said tubular unit to flare the same inwardly, expanding one end portion of the tubular unit to flare the same outwardly, drawing said one end portion completely over the other end portion completely over the other end portion of said tubular unit to a relaxed position short of the final position of said one end portion, partially expanding said other end portion into adhering contact with said one end portion without contacting the relaxed free portions adjacent the edges thereof, drawing said one end portion to said final position to stretch the free portion adjacent the edge of said one end portion thereby correcting distortion in said free portion caused by expansion, and completely expanding said other end portion to simultaneously stretch the free portion adjacent the edge of said other end portion, thereby correcting distortion in said free portion caused by expansion, and expand said free portion into adhering contact with the free portion adjacent the edge of said one end portion.

5. A method of fabricating a diaphragm for use in a fluid spring comprising the steps of forming a flexible tubular unit from a strip of cord fabric coated with a flexible fluid-impermeable curable composition, securing the center of said tubular unit, expanding one half of the tubular unit, drawing said one half completely over the other half of said tubular unit to a relaxed position short of the final position of said one half, partially expanding said other half into adhering contact with said one half without contacting the relaxed free portions adjacent the edges thereof, drawing said one half to said final position to stretch the free portion adjacent the edge of said one half, completely expanding said other half to simultaneously stretch the free portion adjacent the edge of said other half and expand said free portion into adhering contact with the free portion adjacent the edge of said one half, and molding and curing the tubular unit.

6. A method of fabricating a diaphragm for use in a fluid spring comprising the steps of forming a flexible tubular unit from a strip of cord fabric coated with a flexible fluid-impermeable composition in such a manner that the individual cords of the tubular unit are disposed at a cord angle of between 15° and 75°, expanding one end portion of said tubular unit to flare the same outwardly, drawing said one end portion completely over the other end portion of said tubular unit to a relaxed position short of the final position of said one end portion, partially expanding said other end portion into adhering contact with said one end portion without contacting the relaxed free portions adjacent the edges thereof, drawing said one end portion to said final position to stretch the free portion adjacent the edge of said one end portion, and simultaneously stretching the free portion adjacent the edge of said other end portion and completely expanding said other end portion to expand said free portion into adhering contact with the free portion adjacent the edge of said one end portion to obtain a diaphragm having two relatively superposed and substantially coextensive plies of cord fabric, the individual cords of one of the plies extending across the individual cords of the other ply at an included angle of between 30° and 150° and at a cord angle of between 15° and 75°, the included angle and cord angle being substantially constant throughout the diaphragm.

7. A method of fabricating a diaphragm for use in a fluid spring comprising the steps of forming a flexible tubular unit from a strip of cord fabric coated with a flexible fluid-impermeable composition in such a manner that the individual cords of the tubular unit are disposed at a cord angle of between 40° and 55°, expanding one end portion of the tubular unit to flare the same outwardly, drawing said one end portion completely over the other end portion of said tubular unit to a relaxed position short of the final position of said one end portion, partially expanding said other end portion into adhering contact with said one end portion without contacting the relaxed free portions adjacent the edges thereof, drawing said one end portion to said final position to stretch the free portion adjacent the edge of said one end portion, and completely expanding said other end portion to simultaneously stretch the free portion adjacent the edge of said other end portion and expand said free portion into adhering contact with the free portion adjacent the edge of said one end portion to obtain a diaphragm having two relatively superposed and substantially coextensive plies of cord fabric, the individual cords of one of the plies extending across the individual cords of the other ply at an included angle of between 70° and 100° and at a cord angle of between 40° and 55°, the included angle and cord angle being substantially constant throughout the diaphragms.

8. A method of fabricating a diaphragm for use in a fluid spring comprising the steps of positioning a flexible tubular unit, formed from a strip of cord fabric coated with a flexible fluid-impermeable composition, over first and second opposed inflatable tubular mandrels and a disc supported between said mandrels, contracting the center of the tubular unit to engage said disc thereby flaring the same inwardly, inflating said first mandrel to expand one half of said tubular unit thereby flaring the same outwardly, drawing said one half completely over the other half of said tubular unit to a relaxed position short of the final position of said one half, partially inflating said second mandrel to expand said other half into adhering contact with said one half without contacting the relaxed free portions adjacent the edges thereof, drawing said one half to said final position to stretch the free portion adjacent the edge of said one half, and completely inflating said mandrel to simultaneously stretch the free portion adjacent the edge of said other half and expand said free portion into adhering contact with the free portion adjacent the edge of said one half, moving one of the inflatable mandrels relative to the other, and removing the diaphragm with said disc secured in the inwardly flared end of said diaphragm.

9. A method of fabricating a diaphragm for use in a fluid spring comprising the steps of positioning a flexible tubular unit, formed from a strip of cord fabric coated with a flexible fluid-impermeable composition, over first and second opposed inflatable tubular members collapsible on first and second supporting shafts, said first inflatable member having reinforcements extending throughout the entire length thereof and being rigidly secured at the end adjacent the second inflatable member to said first supporting shaft and slidably mounted on said supporting shaft at the other end and said second inflatable member having reinforcements extending the length thereof but terminating at a point short of the end adjacent the first inflatable member and being rigidly secured at both ends to said second supporting shaft, securing the center of said tubular unit, inflating said first inflatable member to expand one half of said tubular unit thereby flaring the same outwardly, drawing said one half completely over the other half of said tubular unit to a relaxed position short of the final position of said one half, partially inflating said second inflatable member to expand said other half into adhering contact with said one half without contacting the relaxed free portions adjacent the edges thereof, drawing said one half to said final position to stretch the free portion adjacent the edge of said one half, and completely inflating said second inflatable member to simultaneously stretch the free portion adjacent the edge of said other half and expand said free portion into adhering contact with the free portion adjacent the edge of said one half, moving one of the inflatable members relative to the other, and removing the diaphragm.

10. A method of fabricating a diaphragm for use in a fluid spring comprising the steps of forming a flexible tubular unit from a strip of cord fabric coated with a flexible fluid-impermeable composition, moving a first annular shaping form over one end portion of the tubular unit, expanding said one end portion into conformity with the inner walls of said first shaping form to thereby flare the same outwardly, moving a second annular shaping form to engage said first shaping form with the edge of said one end portion held therebetween, moving the first and second shaping forms over the other end portion of said tubular unit to a position short of the final position of said second shaping form thereby drawing said one end portion completely over the other end portion to a relaxed position, retracting the first shaping form and partially expanding said other end portion into adhering contact with said one end portion without contacting the relaxed free portions adjacent the edges thereof, moving the second shaping form to said final position to stretch the free portion adjacent the edge of said one end portion, and simultaneously stretching the free portion adjacent the edge of said other end portion and completely expanding said other end portion into conformity with the inner walls of said second shaping form thereby expanding said free portion into adhering contact with the free portion adjacent the edge of said one end portion.

11. A method of fabricating a diaphragm for use in a fluid spring comprising the steps of positioning a flexible tubular unit, formed from a strip of cord fabric coated with a flexible fluid-impermeable composition, over first and second opposed inflatable tubular mandrels, securing the center of said tubular unit, moving a first annular shaping form along said second mandrel and over said first mandrel, inflating said first inflatable mandrel to expand one half of said tubular unit into conformity with the inner walls of said first shaping form thereby flaring the same outwardly, turning the edge of said one half over the first shaping form and deflating said first mandrel, moving a second annular rotatable shaping form along said first mandrel to engage said first shaping form with the edge of said one half held therebetween, moving the first and second shaping forms over the other half of said tubular unit to a position short of the final position of said second shaping form thereby drawing said one half completely over the other half to a relaxed position and turning the edge of said one half over the second shaping form, retracting the first shaping form and partially inflating said second inflatable mandrel to expand said other half into adhering contact with said one half without contacting the relaxed free portion adjacent the edges thereof, moving the second shaping form to said final position to stretch the free portion adjacent the edge of said one half, completely inflating said second inflatable mandrel to expand said other half into conformity with the inner walls of said second shaping form thereby simultaneously stretching the free portion adjacent the edge of said other half and expanding said free portion into adhering contact with the free portion adjacent the edge of said one half, turning the edge of said other half over the edge of said one half, reducing the pressure in said second inflatable mandrel and retracting said second shaping form, and simultaneously rotating said mandrel and adhering said edges to the superposed halves of said tubular unit.

12. A method of fabricating a diaphragm for use in a fluid spring comprising the steps of positioning a flexible tubular unit, formed from a strip of cord fabric coated with a flexible fluid-impermeable composition, over first and second opposed inflatable tubular mandrels and a disc supported between said mandrels, securing the center of the tubular unit to said disc, moving a first annular shaping form along said second mandrel and over said first mandrel, inflating said first inflatable mandrel to expand one half of said tubular unit into conformity with the inner walls of said first shaping form thereby flaring the same outwardly, turning the edge of said one half over the first shaping form and deflating said first mandrel, moving a second annular rotatable shaping form with a bead wire positioned thereon along said first mandrel to engage said first shaping form with the edge of said one half and said bead wire held therebetween, moving the first and second shaping forms over the other half of said tubular unit to a position short of the final position of said second shaping form thereby drawing said one half completely over the other half to a relaxed position and turning the edge of said one half over the bead wire on the second shaping form, retracting the first shaping form and partially inflating said second inflatable mandrel to expand said other half into adhering contact with said one half without contacting the relaxed free portions adjacent the edges thereof, moving the second shaping form to said final position to stretch the free portion adjacent the edge of said one half, completely inflating said second inflatable mandrel to expand said other half into conformity with the inner walls of said second shaping form thereby simultaneously stretching the free portion adjacent the edge of said other half and expanding said free portion into adhering contact with the free portion adjacent the edge of said one half, turning the edge of said other half over the edge of said one half, and simultaneously rotating said first and second mandrels and adhering said edges to the superposed halves of said tubular unit.

13. Apparatus for fabricating a diaphragm for use in a fluid spring, comprising a pair of opposed inflatable tubular mandrels, means for moving one of the inflatable mandrels relative to the other, a pair of annular shaping forms mounted concentric with the inflatable mandrels, and means for individually moving the shaping forms relative to the inflatable mandrels and to each other.

14. Apparatus as defined in claim 13 wherein at least one of the shaping forms is mounted for rotational movement.

15. Apparatus for fabricating a diaphragm for use in a fluid spring comprising a pair of opposed inflatable tubular mandrels, means for moving one of the inflatable mandrels relative to the other, means for rotating at least one of the inflatable mandrels, a pair of annular shaping forms mounted concentric with said inflatable mandrels, and means for individually moving the shaping forms relative to the inflatable mandrels and to each other.

16. Apparatus for fabricating a diaphragm for use in a fluid spring comprising a pair of opposed inflatable tubular mandrels, one of said mandrels having means for supporting a disc, means for moving one of the inflatable mandrels relative to the other, a pair of annular shaping forms mounted concentric with said inflatable mandrels, space projections on one of said shaping forms for positioning a bead wire thereon, and means for individually moving the shaping forms relative to the inflatable mandrels and to each other.

17. Apparatus for fabricating a diaphragm for use in a fluid spring comprising a pair of opposed inflatable tubular members collapsible on supporting shafts, means for moving one of the inflatable members relative to the other, a pair of annular shaping forms mounted concentric with said inflatable members, and means for individually moving the shaping forms relative to the inflatable members and to each other.

18. Apparatus as defined in claim 17 wherein one of the inflatable members has reinforcements extending the length thereof but terminating at a point short of the end adjacent the other inflatable member and is rigidly secured at both ends to the supporting shaft.

19. Apparatus as defined in claim 18 wherein the other inflatable member has reinforcements extending throughout the entire length thereof and is rigidly secured at the end adjacent said one inflatable member to the supporting shaft and slidably mounted on said supporting shaft at the other end.

20. Apparatus for fabricating a diaphragm for use in a fluid spring comprising means for expanding one end portion of a tubular unit formed from a strip of cord fabric coated with a flexible fluid-impermeable composition, means for drawing said one end portion completely over the other end portion of said tubular unit to a relaxed position short of the final position of said one end portion, means for partially expanding said other end portion into adhering contact with said one end portion without contacting the relaxed free portions adjacent the edges thereof, means for drawing said one end portion to said final position to stretch the free portion adjacent the edge of said one end portion, and means for completely expanding said other end portion to simultaneously stretch the free portion adjacent the edge of said other end portion and expand said free portion into adhering contact with the free portion adjacent the edge of said one end portion.

21. Apparatus for fabricating a diaphragm for use in a fluid spring comprising means for contracting the center of a flexible tubular unit formed from a strip of cord fabric with a flexible fluid-impermeable composition coating, means for expanding one half of said tubular unit, means for drawing said one half completely over the other half of said tubular unit to a relaxed position short of the final position of said one half, means for partially expanding said other half into adhering contact with said one half without contacting the relaxed free portions adjacent the edges thereof, means for drawing said one half to said final position to stretch the free portion adjacent the edge of said one half, and means for completely expanding said other half to simultaneously stretch the free portion adjacent the edge of said other half and expand said free portion into adhering contact with the free portion adjacent the edge of said one half.

References Cited in the file of this patent

UNITED STATES PATENTS

| | | |
|---|---|---|
| 2,608,497 | Breth | Aug. 26, 1952 |
| 2,655,321 | Sternad et al. | Oct. 13, 1953 |
| 2,830,923 | Kizzek | Apr. 15, 1958 |
| 2,839,440 | Pfeiffer et al. | June 17, 1958 |